(12) United States Patent
Tachibana et al.

(10) Patent No.: US 6,288,702 B1
(45) Date of Patent: Sep. 11, 2001

(54) INFORMATION DEVICE HAVING ENLARGEMENT DISPLAY FUNCTION AND ENLARGEMENT DISPLAY CONTROL METHOD

(75) Inventors: Yoshimi Tachibana; Hiroyasu Harada, both of Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 08/938,746

(22) Filed: Sep. 26, 1997

(30) Foreign Application Priority Data

Sep. 30, 1996 (JP) .................................................. 8-257915

(51) Int. Cl.[7] .................................................. G06F 17/00
(52) U.S. Cl. .......................................... 345/130; 345/342
(58) Field of Search ..................................... 345/130, 129, 345/132, 127, 342, 346, 339, 340, 113, 341

(56) References Cited

U.S. PATENT DOCUMENTS

| | | | |
|---|---|---|---|
| 5,187,776 | 2/1993 | Yanker | 345/342 |
| 5,511,137 * | 4/1996 | Okada | 382/298 |
| 5,615,384 * | 3/1997 | Allard et al. | 395/800 |
| 5,638,523 * | 6/1997 | Mullet et al. | 345/340 |
| 5,657,047 * | 8/1997 | Tarolli | 345/127 |
| 5,856,821 * | 1/1999 | Funahashi | 345/130 |

FOREIGN PATENT DOCUMENTS 57-25033    2/1982   (JP) .

* cited by examiner

Primary Examiner—Steven Sax
(74) Attorney, Agent, or Firm—Finnegan, Henderson, Farabow, Garrett & Dunner, L.L.P.

(57) ABSTRACT

An enlargement display utility program determines the range of an enlargement display area including a caret displayed on the display screen. The program enlarges an image in the determined range of the enlargement display area at a predetermined magnifying power, and requests the operating system to display the enlarged image in the range of the enlargement display area in a predetermined enlargement display window. With this operation, desired contents can be enlarged/displayed while the enlargement display area is always and automatically set at the position desired by the user.

27 Claims, 8 Drawing Sheets

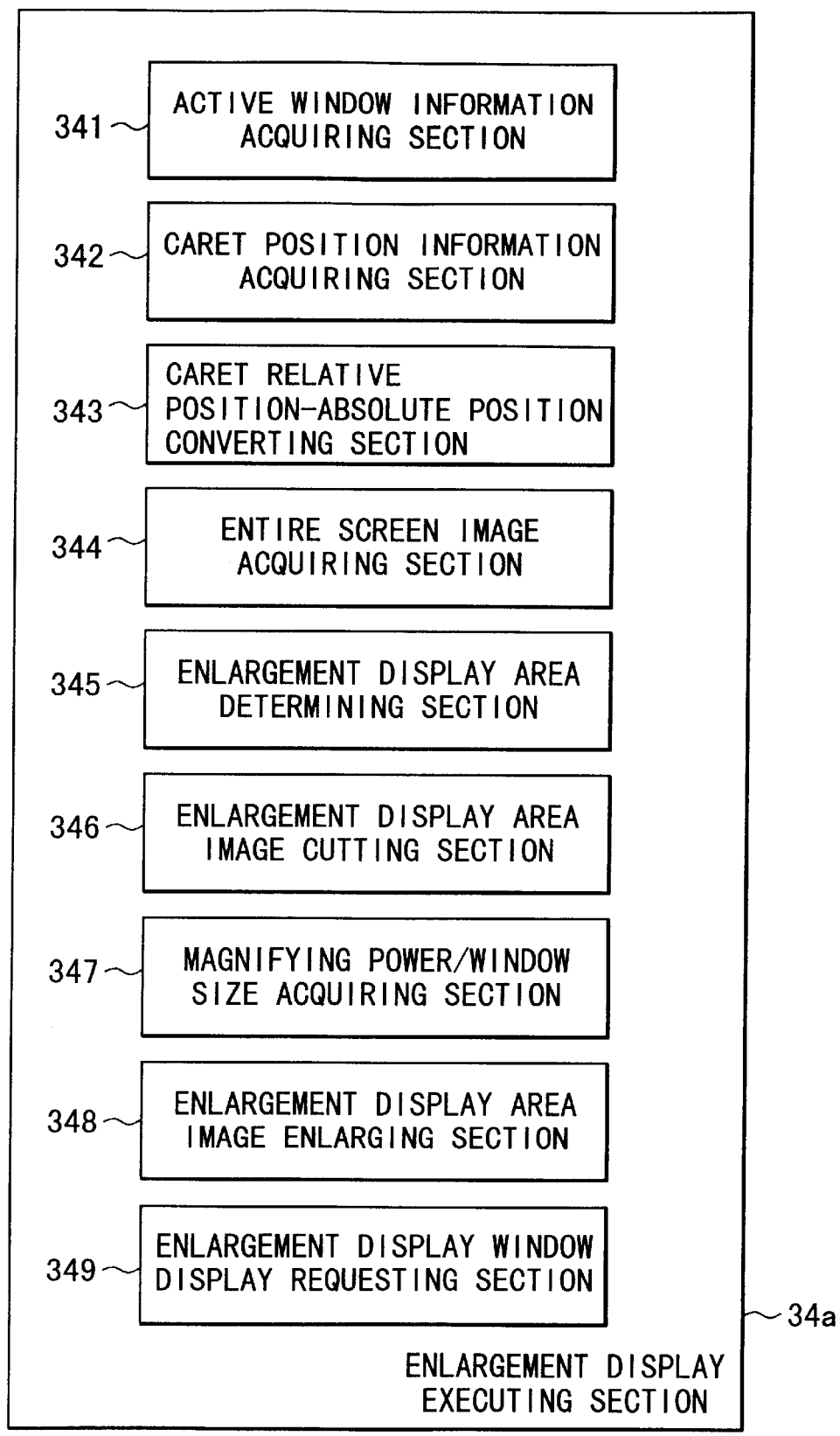
F I G. 7

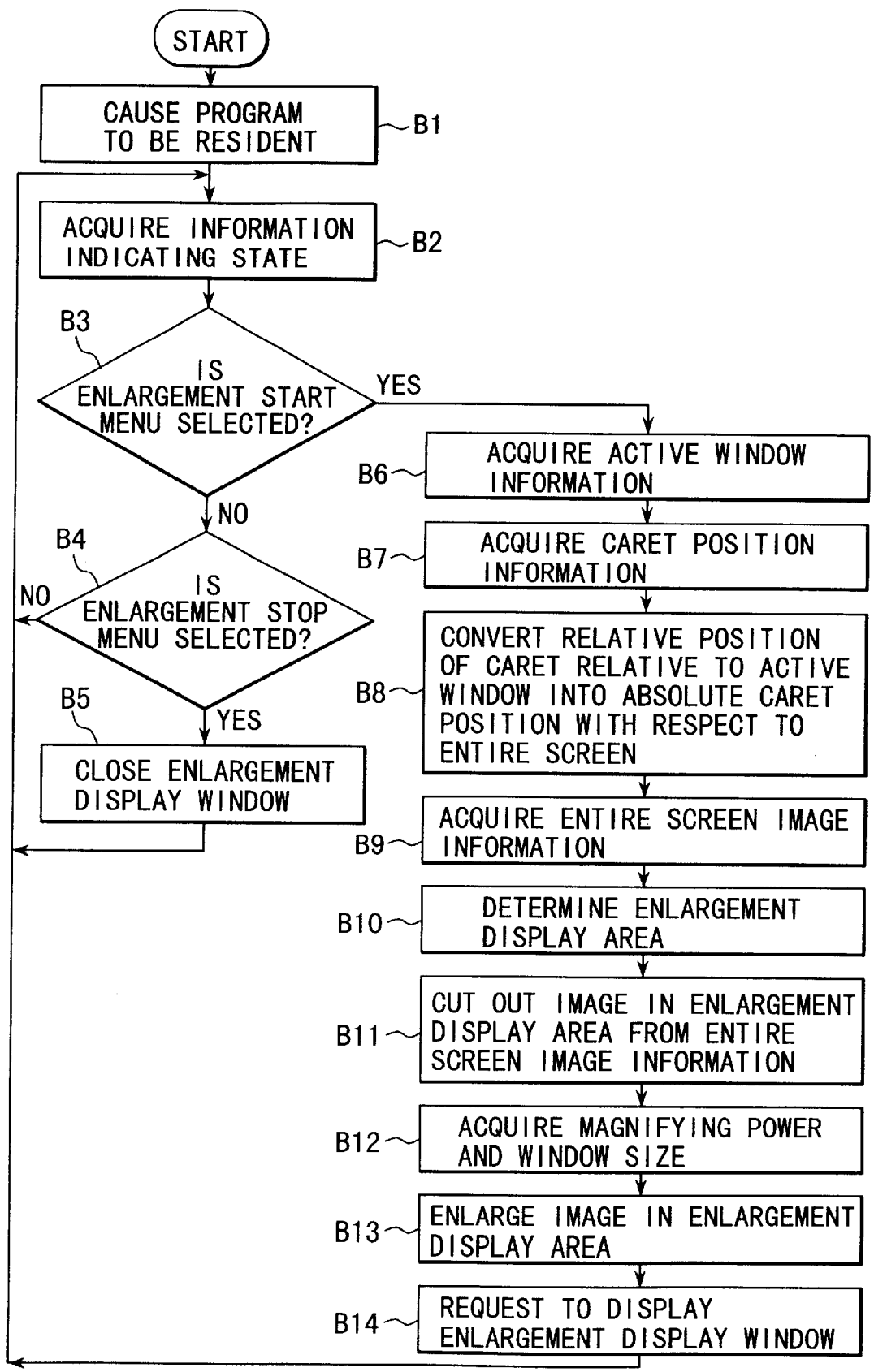
F I G. 9

INFORMATION DEVICE HAVING ENLARGEMENT DISPLAY FUNCTION AND ENLARGEMENT DISPLAY CONTROL METHOD

BACKGROUND OF THE INVENTION

The present invention relates to an information device having an enlargement display function of enlarging/displaying an arbitrary area on the display screen in a window set for enlargement display and an enlargement display control method applied to the device and, more particularly, to an information device and an enlargement display control method which can determine the area to be enlarged/displayed (enlargement display area) on the basis of the display position of the caret indicating the current input position in an input area set on the display screen.

In recent years, various personal computers such as notebook or palm-top type computers which are easy to carry and can be driven by batteries and various compact information terminals called PDA (Personal Digital Assistants) have been developed. Of these portable information devices, some devices have an enlargement display function (implemented by an application program) of setting a window for enlargement display as an independent window, and enlarging/displaying a portion, on the display screen, which is desired by a user in the enlargement display window.

In conventional portable information devices, when the user wants to enlarge/display an input character or the like on the display screen in the enlargement display window, he/she designates two arbitrary points for defining an enlargement display area, i.e., start and end points, with a pointing device such as a mouse. In response to this operation, the application program for implementing the enlargement display function determines the rectangular area defined by the start and end points as an enlargement display area, and operates to enlarge/display the contents displayed in this rectangular area in the enlargement display window at a predetermined magnification. As a result, an input character or the like on the display screen is enlarged/displayed.

When, for example, a character is to be input in an area where displayed characters are too small and illegible, the user must temporarily stop the character input operation to set an enlargement display area. This setting operation greatly deteriorates the operation efficiency. Furthermore, when the input position of a character deviates from the set enlargement display area, a new (enlargement display area must be set, resulting in a deterioration in operability.

The above problems can be summarized as follows.

In a conventional portable information device, every time enlargement display is to be performed, the user must set an enlargement display area with a pointing device or the like. For this purpose, the user must temporarily stop the character input operation he or she is doing, resulting in a great deterioration in processing efficiency.

In addition, when the input position of a character deviates from a set enlargement display area, the user must set a new enlargement display area, resulting in poor operability.

BRIEF SUMMARY OF THE INVENTION

Accordingly, it is an object of the present invention to provide an information device and an enlargement display control method which can enlarge/display desired contents while always and automatically setting an enlargement display area at the position desired by a user without requiring the user to set or re-set the enlargement display area on the display screen.

According to one aspect of the present invention, there is provided an information device having an enlargement display function, comprising: means for determining, on the basis of information indicating a position of a caret movable on a display screen, a range of an enlargement display area so as to make the caret always stay in the enlargement display area; and means for enlarging an image in the determined range of the enlargement display area at a predetermined magnifying power.

The device may further comprise means for requesting to display the enlarged image in the range of the enlargement display area in a predetermined enlargement display window. The device may further comprise means for setting the magnifying power and a size of the enlargement display window. In this case, the determining means determines the range of the enlargement display area in accordance with the set magnifying power and the size of the enlargement display window. In the device, it is desirable that the determining means determine the range of the enlargement display area so as to make the caret always stay at the center of the enlargement display area.

According to another aspect of the present invention, there is provided an information device having an enlargement display function, comprising: means for acquiring information indicating a position of an active window on a display screen from an operating system; means for acquiring information indicating a relative position of a caret on the active window from the operating system; means for converting the relative position of the car(at into an absolute position on the display screen on the basis of the acquired information indicating the position of the active window; means for acquiring image information of the display screen from the operating system; means for determining, on the basis of the acquired information indicating the absolute position of the caret, the range of the enlargement display area so as to make the caret always stay in the enlargement display area; means for cutting out an image in the determined range of the enlargement display area from the acquired image information of the display screen; means for enlarging the cut image in the range of the enlargement display area at a predetermined magnifying power; and means for requesting to display the enlarged image in the range of the enlargement display area in a predetermined enlargement display window.

The device may further comprise means for setting the magnifying power and a size of the enlargement display window. In this case, the determining means determines the range of the enlargement display area in accordance with the set magnifying power and the size of the enlargement display window. In the device, it is desirable that the determining means determine the range of the enlargement display area so as to make the caret always stay at the center of the enlargement display area.

According to another aspect of the present invention, there is provided an enlargement display control method for use in an information device having an enlargement display function, the method comprising the steps of: determining, on the basis of information indicating a position of a caret movable on a display screen, a range of an enlargement display area so as to make the caret always stay in the enlargement display area; and enlarging an image in the determined range of the enlargement display area at a predetermined magnifying power.

According to another aspect of the present invention, there is provided an enlargement display control method for use in an information device having an enlargement display function, the method comprising the steps of: acquiring information indicating a position of an active window on a display screen from an operating system; acquiring information indicating a relative position of a caret on the active window from the operating system; converting the relative position of the caret into an absolute position on the display screen on the basis of the acquired information indicating the position of the active window; acquiring image information of the display screen from the operating system; determining, on the basis of the acquired information indicating the absolute position of the caret, the range of the enlargement display area so as to make the caret always stay in the enlargement display area; cutting out an image in the determined range of the enlargement display area from the acquired image information of the display screen; enlarging the cut image in the range of the enlargement display area at a predetermined magnifying power; and requesting to display the enlarged image in the range of the enlargement display area in a predetermined enlargement display window.

According to another aspect of the present invention, there is provided a storage medium having program code instructions stored thereon which perform enlargement display control when executed by a processor in an information device having an enlargement display function, the instructions comprising: determining, on the basis of information indicating a position of a caret movable on a display screen, a range of an enlargement display area so as to make the caret always stay in the enlargement display area; and enlarging an image in the determined range of the enlargement display area at a predetermined magnifying power.

According to another aspect of the present invention, there is provided a storage medium having program code instructions stored thereon which perform enlargement display control when executed by a processor in an information device having an enlargement display function, the instructions comprising: acquiring information indicating a position of an active window on a display screen from an operating system; acquiring information indicating a relative position of a caret on the active window from the operating system; converting the relative position of the caret into an absolute position on the display screen on the basis of the acquired information indicating the position of the active window; acquiring image information of the display screen from the operating system; determining, on the basis of the acquired information indicating the absolute position of the caret, the range of the enlargement display area so as to make the caret always stay in the enlargement display area; cutting out an image in the determined range of the enlargement display area from the acquired image information of the display screen; enlarging the cut image in the range of the enlargement display area at a predetermined magnifying power; and requesting to display the enlarged image in the range of the enlargement display area in a predetermined enlargement display window.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 7 is a block diagram showing various types of functions constituting an enlargement display executing section in the enlargement display utility program installed in the portable information device according to the embodiment;

FIG. 9 is a flow chart for explaining the operation of the enlargement display executing section in the enlargement display utility program installed in the portable information device according to the embodiment.

DETAILED DESCRIPTION OF THE INVENTION

An embodiment of the present invention will be described below with reference to the accompanying drawing.

Figure 1:
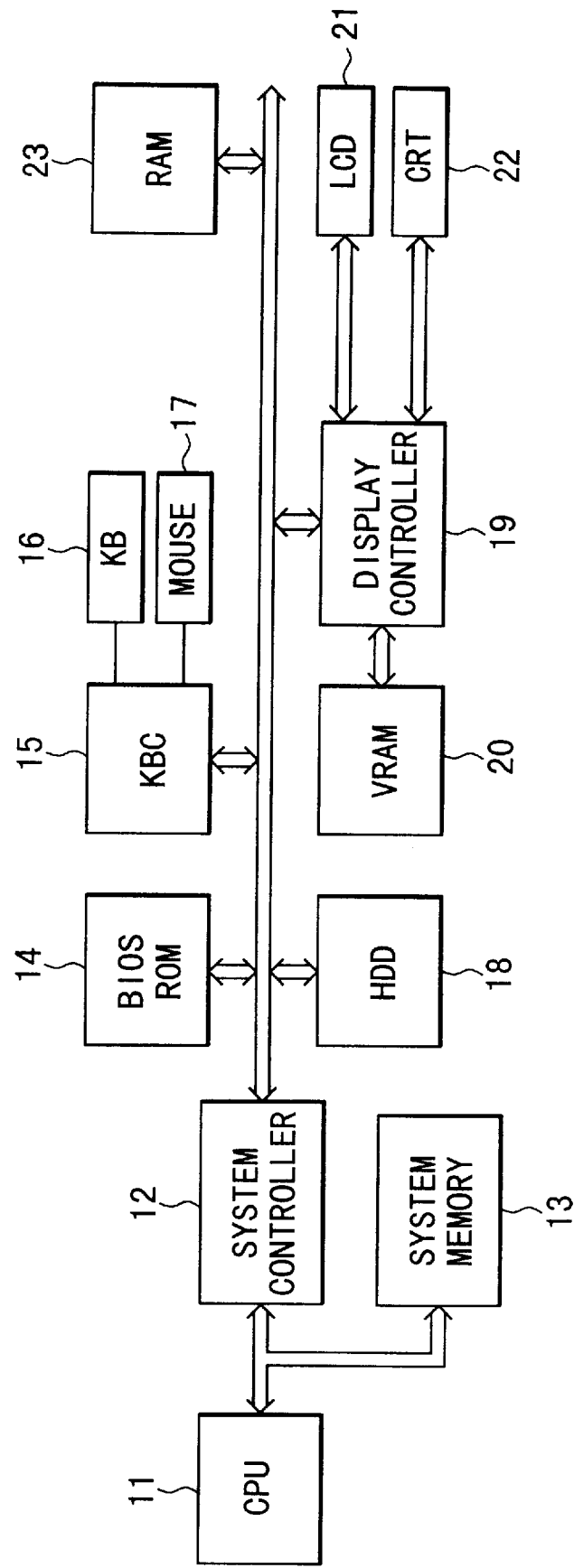
FIG. 1 is a block diagram showing the arrangement of a portable information device according to an embodiment of the present invention.

FIG. 1 shows the arrangement of a portable information device according to this embodiment.

As shown in FIG. 1, this information device includes a CPU 11, a system controller 12, a system memory 13, a BIOS-ROM 14, a keyboard controller (KBC) 15, a keyboard 16, a mouse 17, a hard disk drive (HDD) 18, a display controller 19, a video random access memory (VRAM) 20, a liquid crystal display (LCD) 21, a cathode ray tube (CRT) 22, and a random access memory (RAM) 23.

The CPU 11 executes/controls an operating system and application programs including a utility program which are stored in the system memory 13.

The system controller 12 controls the memory and the I/O in this system.

The system memory 13 stores the operating system and the application programs including the utility program, which are executed/controlled by the CPU 11, user data generated by the application programs, and the like.

The BIOS-ROM 14 is used to store a system-BIOS and a VGA-BIOS, and is constituted by a flash memory to allow program rewrites.

The keyboard controller 15 detects the contents of the operations of the keyboard 16 and the mouse 17 by the user, converts them into input data, and sends the data into the system.

The keyboard 16 is an input device for inputting characters and the like. The keyboard 16 has cursor keys for moving the caret to a character input position on the display screen, character keys for inputting characters, and the like.

The mouse 17 is an input device used to select various items displayed on a window.

The HDD 18 is a secondary storage device having a large capacity and designed to exchange data with the system memory 13.

The display controller 19 performs display control on the LCD 21 and the CRT 22. The display controller 19 receives display data from the CPU 11 and writes it in the VRAM 20.

The VRAM 20 stores display data to be displayed on the LCD 21 or the CRT 22.

The LCD 21 is a display device incorporated in the information device. The CRT 22 is a display device added to the information device.

The RAM 23 is a storage device used to write and read various data.

Figure 2:
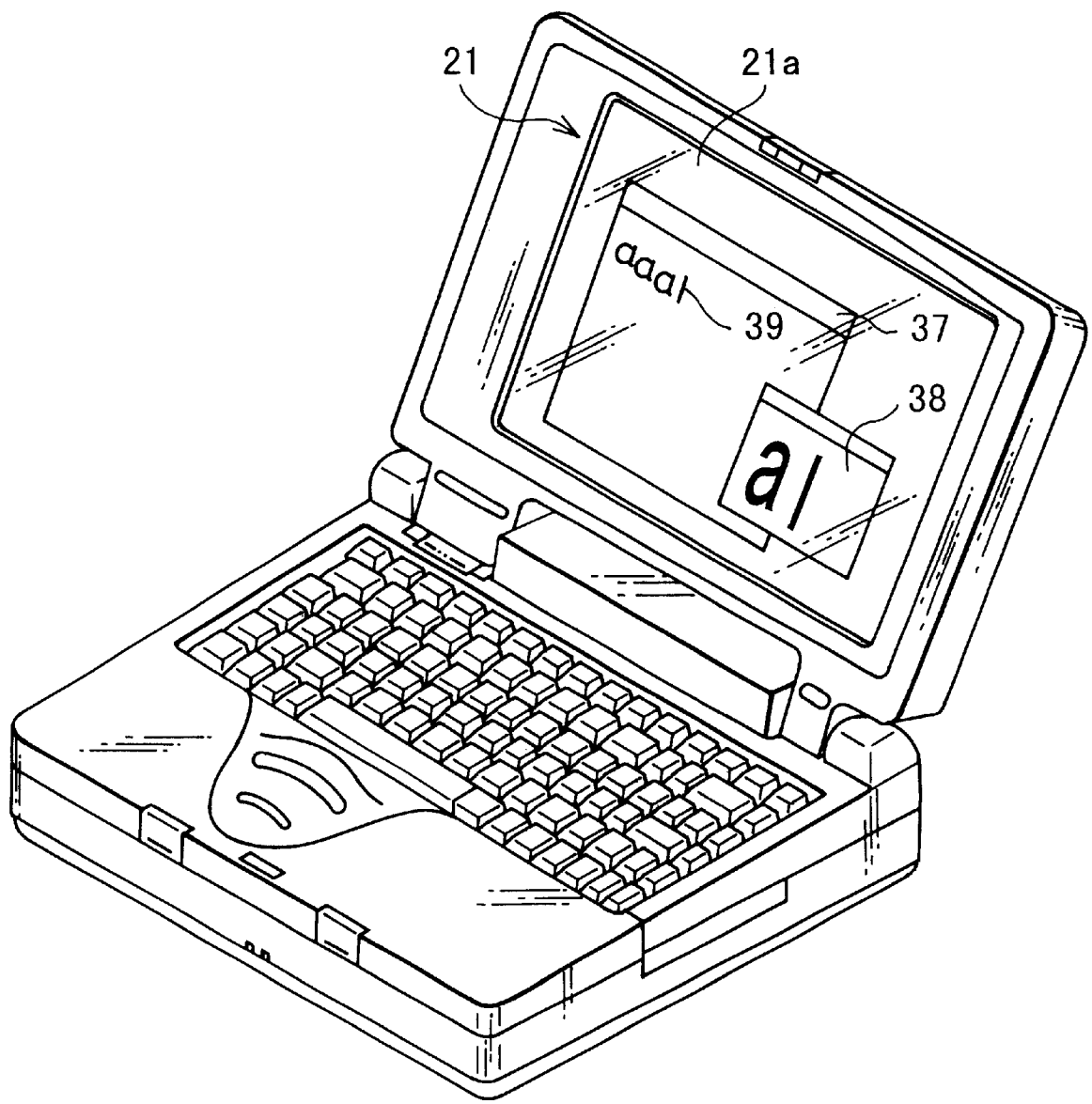
FIG. 2 is a perspective view showing the outer appearance of the portable information device according to this embodiment.

FIG. 2 is a perspective view showing the outer appearance of the portable information device according to this embodiment.

As shown in FIG. 2, an active window 37 and an enlargement display window 38 according to the present invention are simultaneously displayed on a display screen 21a of the LCD 21.

The active window 37 is one of various types of windows currently used by the user to input characters or the like. A caret 39 is displayed in the active window 37. The caret 39 guides the character input operation performed by the user. When, for example, the user depresses a character key or the like of the keyboard 16, the character is input at the position of the caret 39, and at the same time, the caret 39 moves to the right. When, for example, the user operates a cursor key of the keyboard 16, the caret 39 moves vertically or horizontally in accordance with the operation.

The enlargement display window 38 is used to enlarge/display an image in a predetermined range (enlargement display area) including the caret 39 in the active window 37. In this case, as shown in FIG. 2, the caret 39 is preferably set to be always positioned in the center of the enlargement display area.

Note that even while the caret 39 is moving in the active window 37 in a continuous character input operation, an image in a predetermined range including the caret 39 is always enlarged/displayed in the enlargement display window 38. The user can therefore input characters while checking the enlarged image of each character which the user is inputting.

Figure 3:
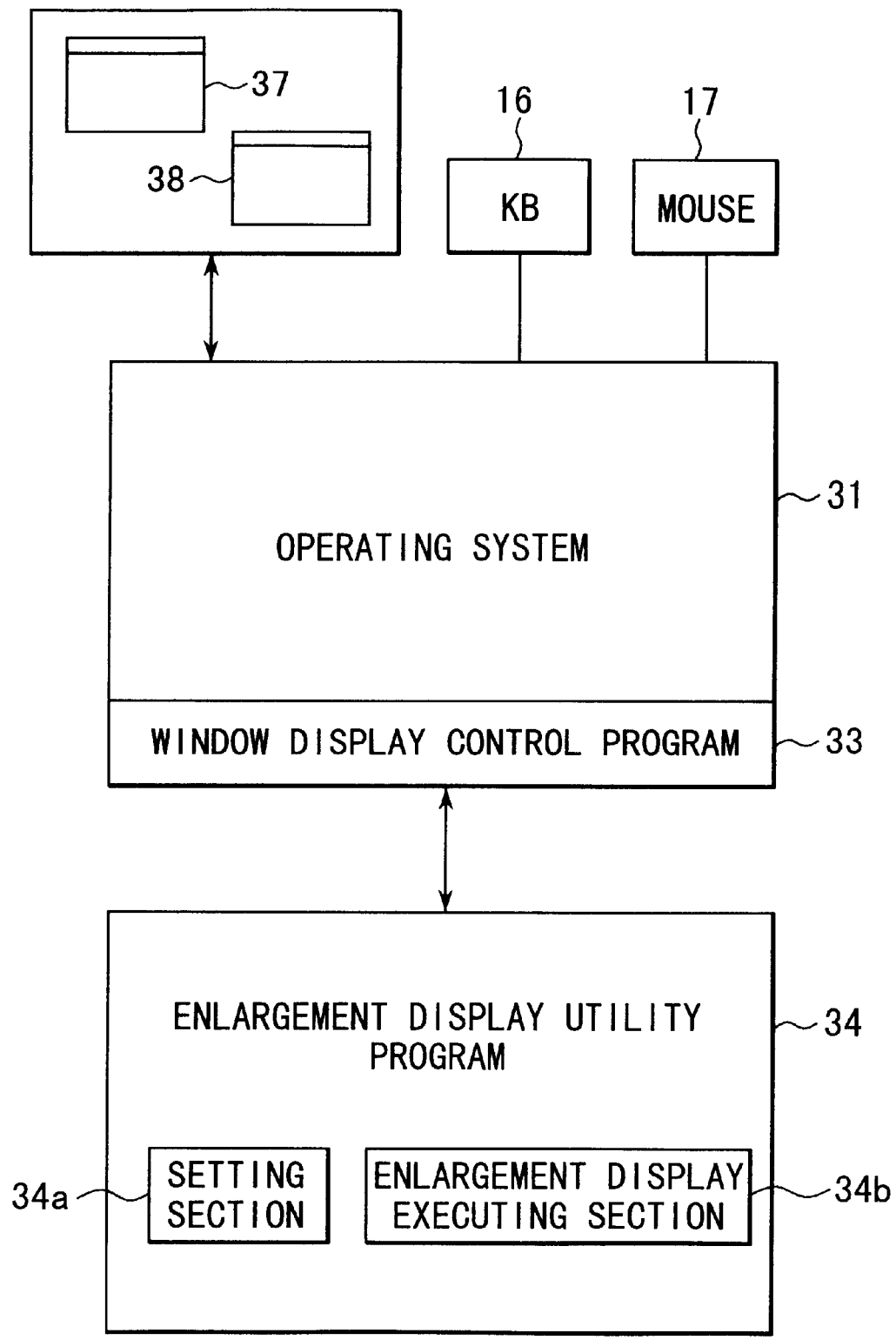
FIG. 3 is a block diagram for explaining the main function of the portable information device according to the embodiment.

FIG. 3 is a block diagram for explaining the main function of the portable information device according to this embodiment.

An operating system 31 controls the entire system. The operating system 31 provides various services in response to requests from various applications which operate under the control of the operating system 31. The operating system 31 includes a window display control program 33 for displaying various types of windows on the display screen 21a of the LCD 21.

Figure 4:
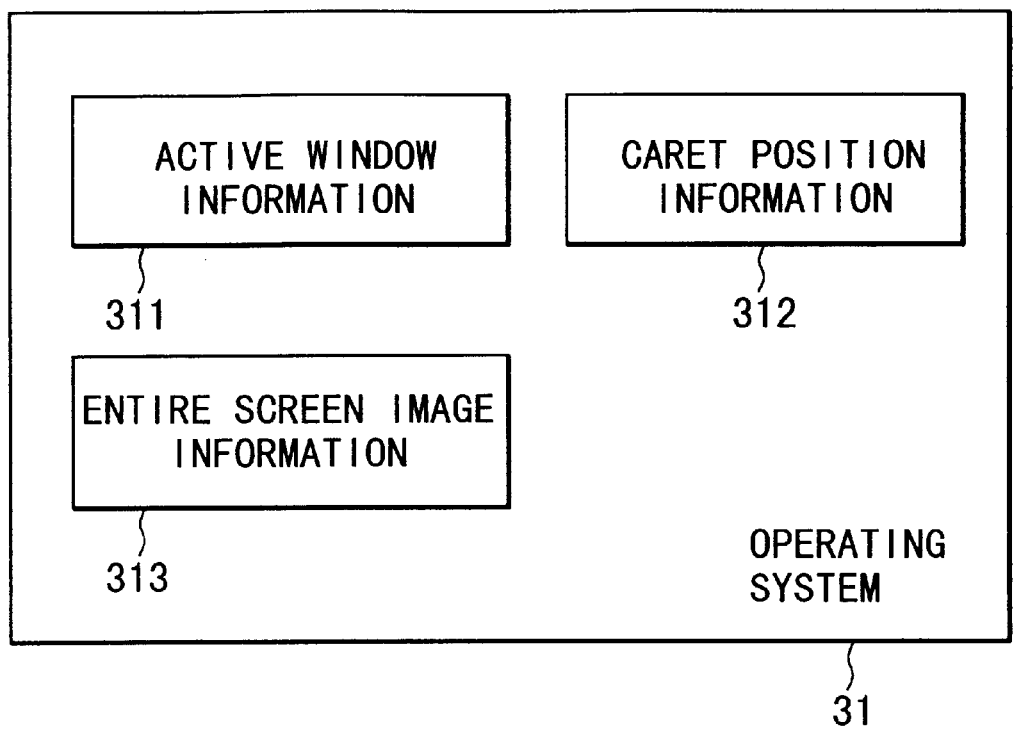
FIG. 4 is a block diagram for explaining various types of information held in the operating system installed in the portable information device according to the embodiment.

As shown in FIG. 4, the operating system 31 holds active window information 331, caret position information 312, and entire screen image information 313 in predetermined storage areas.

The active window information 311 includes information indicating the identifier of a window (active window), of various types of windows, which is currently active, and information indicating the positions of the respective windows. The caret position information 312 indicates the position of the caret relative to the active window (to be referred to as the relative position hereinafter). The entire screen image information 313 represents the entire screen image displayed on the LCE 21. Note that these pieces of information are used to implement the enlargement display function of the present invention.

Referring back to FIG. 3, an enlargement display utility program 34 is an application program for implementing the enlargement display function of the present invention. The enlargement display utility program 34 is resident in the operating system 31.

The enlargement display utility program 34 includes a setting section 34a and an enlargement display executing section 34b.

The setting section 34a provides the user with a setting screen display for setting a "magnifying power" indicating a magnification at which an enlargement display area is to be displayed in the enlargement display window 38, a "window size" indicating the width or height of the enlargement display window, and the like. The setting section 34a stores the contents set by the user in a predetermined storage area (e.g., the RAM 23) in the system.

Figure 5:
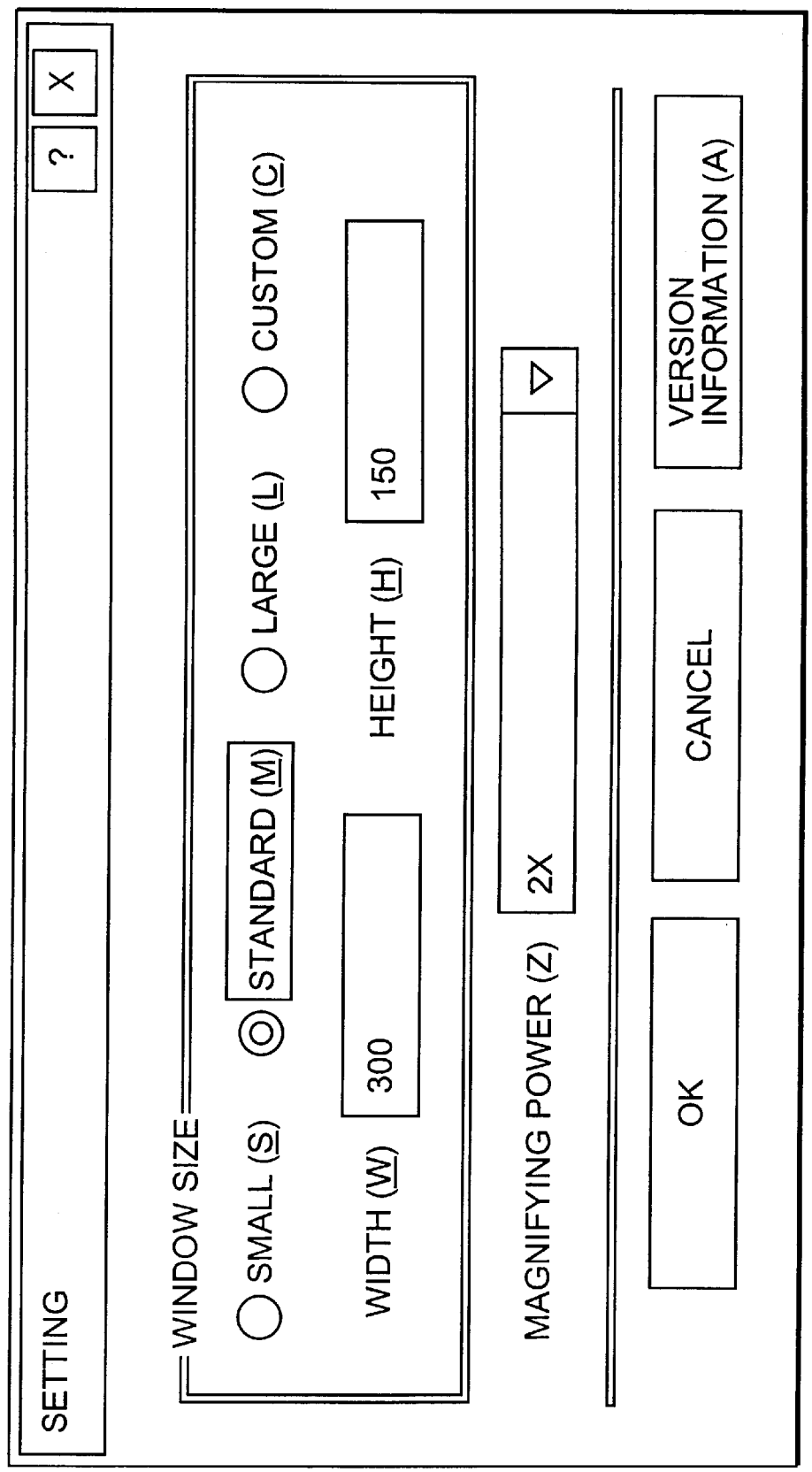
FIG. 5 is a view showing a setting screen display based on an enlargement display utility program installed in the portable information device according to the embodiment.

FIG. 5 shows an example of the above setting screen display. The user sets "magnifying power" and "window size" to arbitrary values on this setting screen display to allow the user to easily check the character in the enlargement display window 38.

Referring back to FIG. 6, the range of an enlargement display area 40 on the display screen can be arbitrarily changed by changing the values of "magnifying power" and "window size". For example, a range different from the range of the enlargement display area in FIG. 2 can be set like the enlargement display area 40 in FIG. 6. Note that the frame indicating the enlargement display area 40 does not appear on the display screen.

Figure 6:
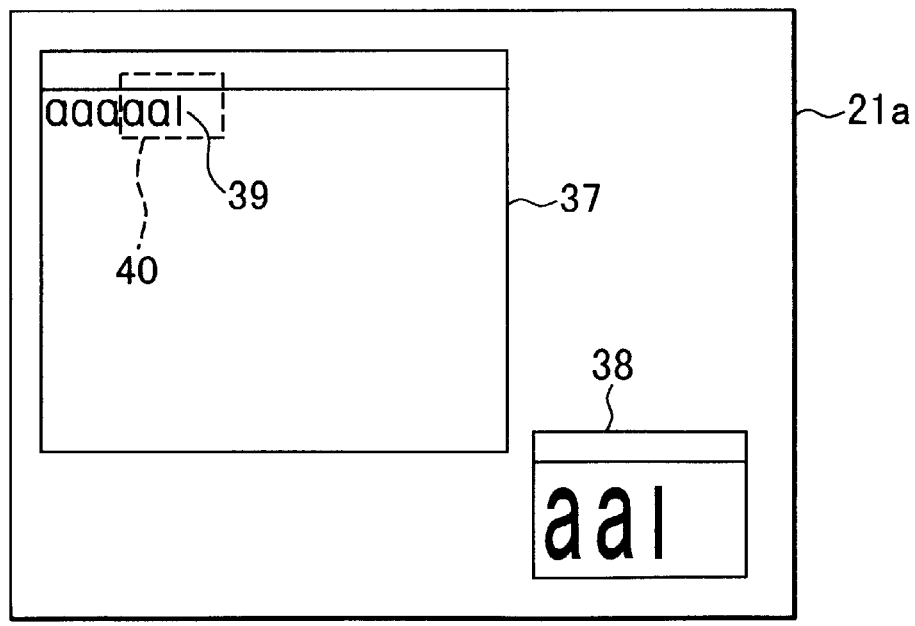
FIG. 6 is a view showing how an enlargement display area is enlarged/displayed in an enlargement display window on the display screen of the portable information device according to the embodiment.

While the window of the setting screen display in FIG. 5 is open on the display screen 21a in FIG. 6, the user can proceed with a setting operation while visually checking the actual size of the enlargement display window and the actual range of the enlargement display area 40 on the display screen 21a.

The enlargement display executing section 34b, shown in FIG. 3, executes processing to enlarge/display an image in an area having a predetermined range (enlargement display area 40) centered on the caret 39 in the active window 37 by using "active window information", "caret position information", and "entire screen image information" held in the operating system 31.

FIG. 7 is a block diagram showing various functions constituting the enlargement display executing section 34b of the enlargement display utility program 34.

An active window information acquiring section 341 acquires information indicating the position of an active window from the active window information 311 held in the operating system 31.

A caret position information acquiring section 342 acquires information indicating the relative position of the caret (the caret position relative to the active window) from the caret position information 312 held in the operating system 31.

A caret relative position-absolute position converting section 343 converts the relative position of the caret into a caret position (to be referred to as an absolute position) with respect to the entire display screen 21a.

An entire screen image acquiring section 344 acquires "entire screen image information" held in the operating system 31.

An enlargement display area determining section 345 determines the range of the enlargement display area 40 to be cut out, on the basis of the magnifying power and the window size which are set by the user in advance. Note that the enlargement display area determining section 345 determines the range of the enlargement display area 40 such that the caret 39 is always included in the enlargement display area 40. The enlargement display area determining section 345, in particular, preferably determines the range of the enlargement display area 40 such that the caret 39 is always positioned in the center of the enlargement display area 40.

An enlargement display area image cutting section 346 cuts out an image in the enlargement display area 40 whose range is determined from the acquired "entire screen image information".

A magnifying power/window size acquiring section 347 acquires the magnifying power and the window size which are set by the user in advance.

An enlargement display area image enlarging section 348 enlarges the image in the enlargement display area 40 on the basis of the acquired magnifying power.

An enlargement display window display requesting section 349 requests the operating system 31 to display an enlarged image in the enlargement display area 40 in the enlargement display window 38 having the above window size.

Figure 8:
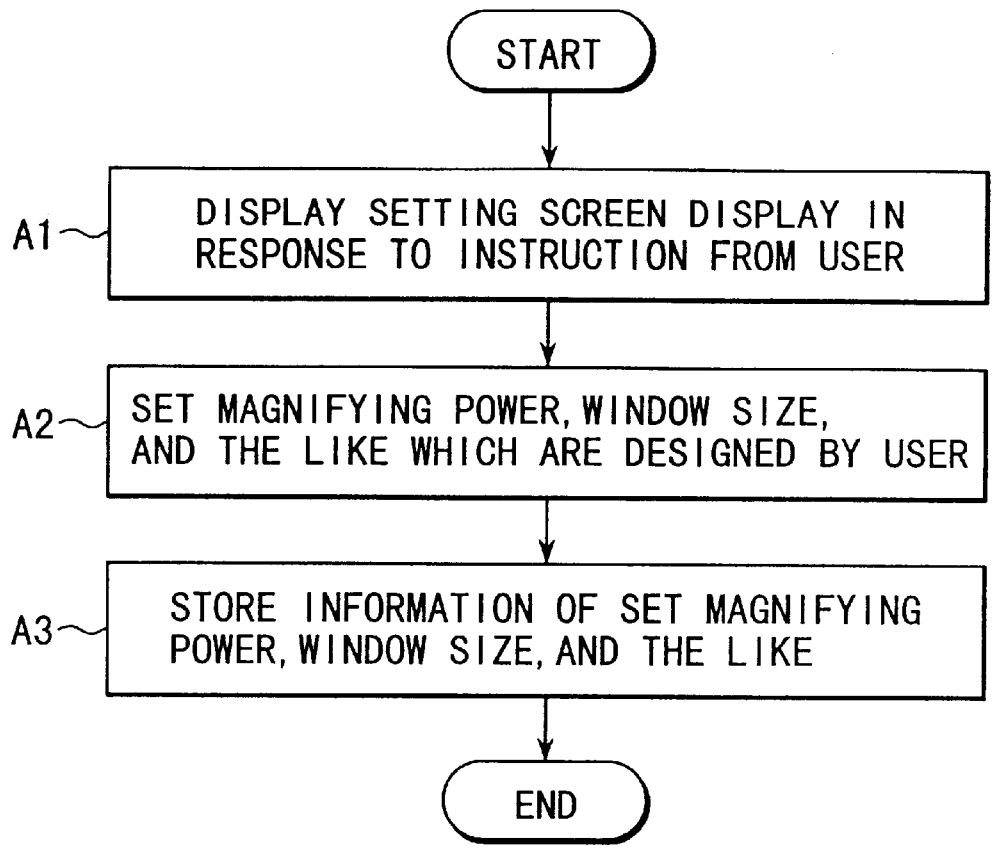
FIG. 8 is a flow chart for explaining the operation of a setting section in the enlargement display utility program installed in the portable information device according to the embodiment.

The operation of the setting section 34a of the enlargement display utility program 34 will be described next with reference to FIG. 8.

First of all, in response to an instruction from the user, the enlargement display utility program 34 displays the setting screen display (FIG. 5) on the display screen 21a (step A1).

The enlargement display utility program 34 sets the magnifying power, the window size, and the like which are designated by the user (step A2).

The enlargement display utility program 34 stores the information of the set magnifying power, window size, and the like in a predetermined storage area (e.g., the RAM 23) (step A3).

The information of the magnifying power, window size, and the like stored in this manner are used for the processing executed by the enlargement display executing section 34b, as described later.

The operation of the enlargement display executing section 34b of the enlargement display utility program 34 will be described next with reference to FIG. 9.

First of all, the enlargement display utility program 34 is resident in the operating system 31 as a resident program (step B1).

The enlargement display utility program 34 acquires, from predetermined setting information, information indicating whether the enlargement display function is in use (step B2).

The enlargement display utility program 34 checks whether an enlargement start menu is selected from the setting information (step B3).

If NO in step B3, the enlargement display utility program 34 checks whether an enlargement stop menu is selected from the setting information (step B4).

If NO in step B4, the flow returns to step B2. If YES in step B4, the enlargement display utility program 34 closes the enlargement display window displayed on the display screen (step B5), and the flow returns to step B2.

If YES in step B3, the enlargement display utility program 34 performs the following processing.

If YES in Step B3, the enlargement display utility program 34 requests the active window information 311 held in the operating system 31 from the operating system 31, and acquires it (step B6).

Subsequently, the enlargement display utility program 34 requests the caret position information 312 held in the operating system 31 from the operating system 31 (step B7).

The enlargement display utility program 34 converts the relative position of the caret into a caret position (absolute position) with respect to the entire display screen 21a by referring to the "position of active window" included in the active window information 311 (step B8).

The enlargement display utility program 34 requests "entire screen image information" held in the operating system 31 from the operating system 31, and acquires it (step B9).

The enlargement display utility program 34 determines the range of the enlargement display area 40 to be cut out, on the basis of the magnifying power and the window size which are set by the user in advance (step B10).

The enlargement display utility program 34 cuts out an image in the enlargement display area 40 whose range is determined from the acquired "entire screen image information" (step B11).

The enlargement display utility program 34 acquires the magnifying power and the window size which are set by the user in advance (step B12).

The enlargement display utility program 34 enlarges the image in the enlargement display area 40 on the basis of the acquired magnifying power (step B13).

The enlargement display utility program 34 requests the operating system 31 to display the enlarge image in the enlargement display area 40 in the enlargement display window 38 having the above window size (step B14).

Subsequently, the operating system 31 operates in response to the above request to display the enlarged image in the enlargement display area 40 in the enlargement display window 38.

Figures 10A, 10B:
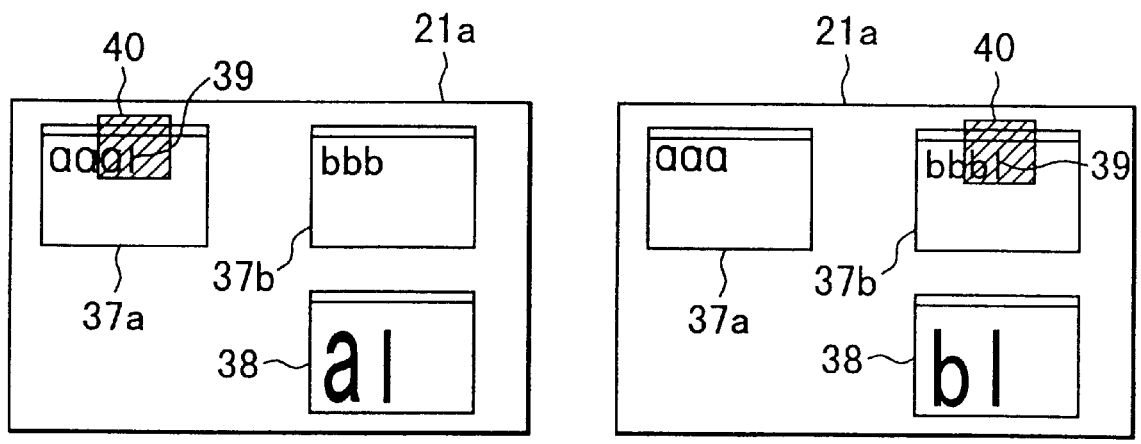
FIGS. 10A and 10B are views how the enlargement display area is switched upon switching of the active window on the display screen of the portable information device according to the embodiment.

FIGS. 10A and 10B show how the enlargement display area is switched upon switching of the active window on the display screen 21a.

Consider a case in which a window 37a of two windows 37a and 37b is an active window, as shown in FIG. 10A. In this case, the caret 39 exists in the window 37a as an active window, and the enlargement display area 40 having a predetermined range is set to be centered on the caret 39. An image in the enlargement display area 40 in this window 37a is enlarged/displayed in the enlargement display window 38.

Assume that the active window is switched from the window 37a to the window 37b, as shown in FIG. 10B. In this case, the caret 39 displayed in the window 37a disappears, and is displayed in the window 37b. The enlargement display area 40 having a predetermined range is then set to be centered on the caret 39. An image in the enlargement display area 40 in the window 37b is enlarged/displayed in the enlargement display window 38.

Even when the active window is switched between a plurality of windows in this manner, an image in the enlargement display area 40 in the active window is always enlarged/displayed in the enlargement display window 38 properly.

As has been described in detail above, according to the present invention, desired contents can be enlarged/displayed while an enlargement display area is always and automatically set at the position desired by the user without requiring the user to set or re-set the enlargement display area on the display screen.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, to ensure flexibility in user operation, the above system can be easily and effectively changed to allow an enlargement display area to be set as a fixed area as in the prior art. In addition, the above enlargement display utility program can be stored, as program code instructions which can be used by the processor of a computer or the like to execute enlargement display processing, in a general magnetic disk such as a floppy disk or a hard disk, an optical disk such as a CD-ROM or a DVD, or a recording medium such as a semiconductor memory to be distributed.

What is claimed is:

1. An information device having an enlargement display function, comprising:
    means for determining, on the basis of information indicating a position of a pointer movable on a display screen, a range of an enlargement display area so as to make the pointer always stay in the enlargement display area;
    means for enlarging an image in the determined range of the enlargement display area at a predetermined magnifying power;
    wherein the enlarged image is displayed with an enlarged pointer in a predetermined enlargement display window and is separately displayed from the image in the enlargement display area of said display screen.

2. A device according to claim 1, further comprising:
    means for requesting to display the enlarged image in the range of the enlargement display area in the predetermined enlargement display window.

3. A device according to claim 2, further comprising:
    means for setting the magnifying power and a size of the enlargement display window.

4. A device according to claim 3, wherein said determining means determines the range of the enlargement display area in accordance with the set magnifying power and the size of the enlargement display window.

5. A device according to claim 1, wherein said determining means determines the range of the enlargement display area so as to make the pointer always stay at the center of the enlargement display area.

6. An information device having an enlargement display function, comprising:
    means for acquiring information indicating a position of an active window on a display screen from an operating system;
    means for acquiring information indicating a relative position of a pointer on the active window from the operating system;
    means for converting the relative position of the pointer into an absolute position on the display screen on the basis of the acquired information indicating the position of the active window;
    means for acquiring image information of the display screen from the operating system;
    means for determining, on the basis of the acquired information indicating the absolute position of the pointer, the range of the enlargement display area so as to make the pointer always stay in the enlargement display area;
    means for cutting out an image in the determined range of the enlargement display area from the acquired image information of the display screen;
    means for enlarging the cut image in the range of the enlargement display area at a predetermined magnifying power; and
    means for requesting to display the enlarged image in the range of the enlargement display area in a predetermined enlargement display window.

7. A device according to claim 6, further comprising:
    means for setting the magnifying power and a size of the enlargement display window.

8. A device according to claim 7, wherein said determining means determines the range of the enlargement display area in accordance with the set magnifying power and the size of the enlargement display window.

9. A device according to claim 6, wherein said determining means determines the range of the enlargement display area so as to make the pointer always stay at the center of the enlargement display area.

10. An enlargement display control method for use in an information device having an enlargement display function, said method comprising the steps of:
    determining, on the basis of information indicating a position of a pointer movable on a display screen, a range of an enlargement display area so as to make the pointer always stay in the enlargement display area; and
    enlarging an image in the determined range of the enlargement display area at a predetermined magnifying power,
    wherein the enlarged image is displayed with an enlarged pointer in a predetermined enlargement display window and is separately displayed from the image in the enlargement display area of said display screen.

11. A method according to claim 10, further comprising the step of:
    requesting to display the enlarged image in the range of the enlargement display area in the predetermined enlargement display window.

12. A method according to claim 11, further comprising the step of:
    setting the magnifying power and a size of the enlargement display window.

13. A method according to claim 12, wherein the range of the enlargement display area is determined in accordance with the set magnifying power and the size of the enlargement display window.

14. A method according to claim 10, wherein the range of the enlargement display area is determined so as to make the pointer always stay at the center of the enlargement display area.

15. An enlargement display control method for use in an information device having an enlargement display function, said method comprising the steps of:

acquiring information indicating a position of an active window on a display screen from an operating system;

acquiring information indicating a relative position of a pointer on the active( window from the operating system;

converting the relative position of the pointer into an absolute position on the display screen on the basis of the acquired information indicating the position of the active window;

acquiring image information of the display screen from the operating system;

determining, on the basis of the acquired information indicating the absolute position of the pointer, the range of the enlargement display area so as to make the pointer always stay in the enlargement display area;

cutting out an image in the determined range of the enlargement display area from the acquired image information of the display screen;

enlarging the cut image in the range of the enlargement display area at a predetermined magnifying power; and requesting to display the enlarged image in the range of the enlargement display area in a predetermined enlargement display window.

16. A method according to claim 15, further comprising the step of:

setting the magnifying power and a size of the enlargement display window.

17. A method according to claim 16, wherein the range of the enlargement display area is determined in accordance with the set magnifying power and the size of the enlargement display window.

18. A method according to claim 15, wherein the range of the enlargement display area is determined so as to make the pointer always stay at the center of the enlargement display area.

19. A storage medium having program code instructions stored thereon which perform enlargement display control when executed by a processor in an information device having an enlargement display function, said instructions comprising:

determining, on the basis of information indicating a position of a pointer movable on a display screen, a range of an enlargement display area so as to make the pointer always stay in the enlargement display area; and enlarging an image in the determined range of the enlargement display area at a predetermined magnifying power;

wherein the enlarged image is displayed with an enlarged pointer in a predetermined enlargement display window and is separately displayed from the image in the enlargement display area of said display screen.

20. A medium according to claim 19, said instructions further comprise:

requesting to display the enlarged image in the range of the enlargement display area in the predetermined enlargement display window.

21. A medium according to claim 20, said instructions further comprise:

setting the magnifying power and a size of the enlargement display window.

22. A medium according to claim 21, wherein the range of the enlargement display area is determined in accordance with the set magnifying power and the size of the enlargement display window.

23. A medium according to claim 19, wherein the range of the enlargement display area is determined so as to make the pointer always stay at the center of the enlargement display area.

24. A storage medium having program code instructions stored thereon which perform enlargement display control when executed by a processor in an information device having an enlargement display function, said instructions comprising:

acquiring information indicating a position of an active window on a display screen from an operating system;

acquiring information indicating a relative position of a pointer on the active window from the operating system;

converting the relative position of the pointer into an absolute position on the display screen on the basis of the acquired information indicating the position of the active window;

acquiring image information of the display screen from the operating system;

determining, on the basis of the acquired information indicating the absolute position of the pointer, the range of the enlargement display area so as to make the pointer always stay in the enlargement display area;

cutting out an image in the determined range of the enlargement display area from the acquired image information of the display screen;

enlarging the cut image in the range of the enlargement display area at a predetermined magnifying power; and requesting to display the enlarged image in the range of the enlargement display area in a predetermined enlargement display window.

25. A medium according to claim 24, said instructions further comprise:

setting the magnifying power and a size of the enlargement display window.

26. A medium according to claim 25, wherein the range of the enlargement display area is determined in accordance with the set magnifying power and the size of the enlargement display window.

27. A medium according to claim 24, wherein the range of the enlargement display area is determined so as to make the pointer always stay at the center of the enlargement display area.

\* \* \* \* \*